(12) United States Patent
Downs et al.

(10) Patent No.: US 8,469,854 B1
(45) Date of Patent: Jun. 25, 2013

(54) DISCONNECTABLE DRIVELINE FOR ALL-WHEEL DRIVE VEHICLE

(75) Inventors: James Preston Downs, South Lyon, MI (US); Paul Joseph Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 13/471,560

(22) Filed: May 15, 2012

(51) Int. Cl.
*F16H 48/06* (2006.01)
*F16H 48/20* (2006.01)

(52) U.S. Cl.
USPC .......................................... 475/221; 475/231

(58) Field of Classification Search
USPC ......................................... 475/221, 223, 231
See application file for complete search history.

(56) References Cited

U.S. PATENT DOCUMENTS

| | | | |
|---|---|---|---|
| 4,407,387 A | 10/1983 | Lindbert | |
| 4,915,190 A | 4/1990 | Iwata | |
| 5,105,901 A | 4/1992 | Watanabe et al. | |
| 5,105,902 A | 4/1992 | Wilson et al. | |
| 5,411,110 A | 5/1995 | Wilson et al. | |
| 5,562,566 A | 10/1996 | Yang | |
| 5,951,428 A | 9/1999 | Itoh et al. | |
| 6,113,512 A | 9/2000 | Williams | |
| 6,186,258 B1 | 2/2001 | Deutschel et al. | |
| 6,263,995 B1 | 7/2001 | Watson et al. | |
| 6,805,653 B2 | 10/2004 | Krzesicki et al. | |
| 6,814,682 B2 | 11/2004 | Spitale | |
| 6,974,400 B2 | 12/2005 | Williams | |
| 7,150,694 B2 | 12/2006 | Mizon et al. | |
| 7,309,301 B2 * | 12/2007 | Janson et al. | 475/200 |
| 7,331,896 B1 | 2/2008 | Kroppe | |
| 7,533,754 B2 | 5/2009 | Burrows et al. | |
| 8,042,642 B2 | 10/2011 | Marsh et al. | |
| 8,047,323 B2 | 11/2011 | Downs et al. | |
| 2003/0040394 A1 * | 2/2003 | Palazzolo | 475/221 |
| 2005/0023063 A1 | 2/2005 | Mueller | |
| 2006/0283654 A1 | 12/2006 | Krisher | |
| 2011/0275470 A1 | 11/2011 | Ekonen et al. | |
| 2011/0319213 A1 | 12/2011 | Ekonen et al. | |
| 2012/0073929 A1 | 3/2012 | Grutter et al. | |

FOREIGN PATENT DOCUMENTS

| | | |
|---|---|---|
| KR | 2019990020807 U | 6/1999 |
| KR | 100274035 B1 | 12/2000 |
| KR | 100483163 B1 | 4/2005 |

OTHER PUBLICATIONS

International Search Report and Written Opinion for International Application No. PCT/US2009/053514, dated Mar. 29, 2010.
International Preliminary Report on Patentability (Chapter I of the Patent Cooperation Treaty) for PCT/US2009/053514, issued Feb. 15, 2011.
International Search Report and Written Opinion for International Application No. PCT/US2010/041767, dated Feb. 28, 2011.

* cited by examiner

*Primary Examiner* — Edwin A Young
(74) *Attorney, Agent, or Firm* — Harness, Dickey & Pierce, P.L.C.

(57) ABSTRACT

A disconnectable driveline arrangement for an all-wheel drive vehicle includes a power take-off unit having a disconnect mechanism, a rear drive module having a torque transfer device and a limited slip clutch assembly, and a control system for controlling actuation of the disconnect mechanism, the torque transfer device and the limited slip clutch assembly.

20 Claims, 10 Drawing Sheets

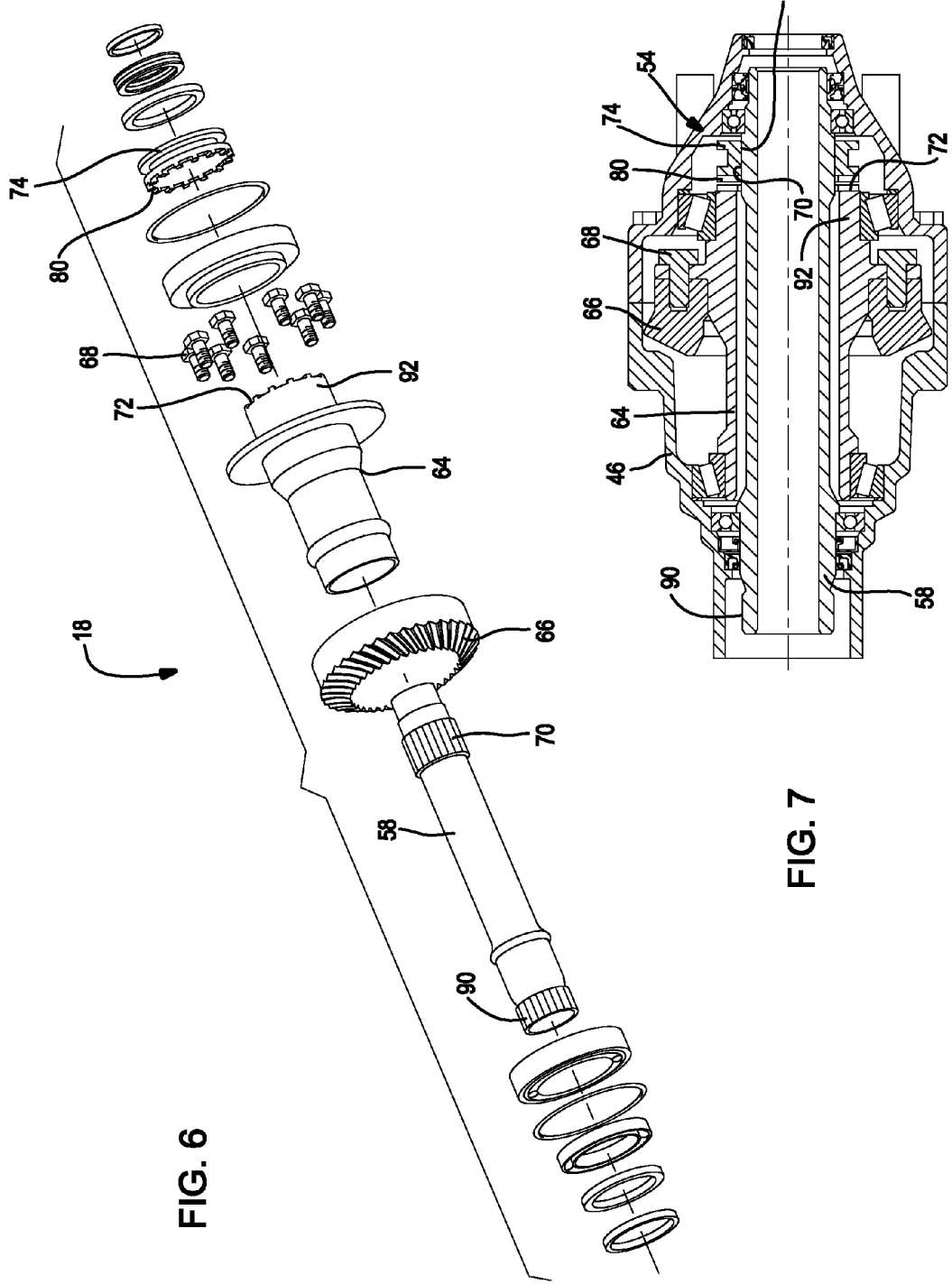

DISCONNECTABLE DRIVELINE FOR ALL-WHEEL DRIVE VEHICLE

FIELD

The present disclosure relates generally to all-wheel drive vehicles and more particularly to disconnectable drivelines for all-wheel drive vehicles.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction when the vehicle is operated in inclement weather and on off-highway road conditions. Such AWD vehicles necessarily are equipped with a much more complex drivetrain which, in addition to the primary driveline, must include the additional components associated with the secondary driveline such as a power take-off unit and a propshaft.

In an effort to minimize driveline losses (i.e., viscous drag, friction, inertia and oil churning) associated with secondary driveline being back-driven when no drive torque is transmitted thereto, it is known to incorporate a disconnect system that is configured to uncouple components of the secondary driveline such as, for example, the rear wheels or the rear differential from the remainder of the secondary driveline. To this end, there remains a need in the art for development of improved disconnectable drivelines for use in AWD vehicles.

SUMMARY

It is an aspect of the present teachings to provide a disconnectable secondary driveline arrangement for use with all-wheel drive vehicles that includes a power take-off unit having a disconnect mechanism, a rear drive module having a torque transfer device capable of providing disconnect and torque biasing functions, a limited slip clutch assembly capable of limiting speed differentiation between the secondary wheels, and a control system for controlling actuation of the disconnect mechanism, the torque transfer device and the limited slip clutch assembly.

In accordance with this and other aspects of the present teachings, an all-wheel drive vehicle can include a powertrain, a primary driveline, a power switching mechanism, a secondary driveline, and a control system. The powertrain can include a prime mover and a transmission having an output. The primary driveline is driven by the transmission output and is operable to direct rotary power from the prime mover to a pair of primary vehicle wheels. The power switching mechanism is operable under the control of the control system in one of a disconnected mode and a connected mode. The power switching mechanism is operable in its connected mode to direct rotary power from the transmission output to the secondary driveline. The secondary driveline can include a rear drive module and a propshaft that couples an output of the power switching mechanism to an input of the rear drive module. The rear drive module can include a secondary differential interconnecting a pair of axleshafts to a pair of secondary vehicle wheels, a torque transfer device operably disposed between the input and the secondary differential, and a limited slip clutch assembly operably disposed between the secondary differential and one of the axleshafts. The torque transfer device is operable under the control of the control system in one of a disconnected mode and a connected mode. The torque transfer device is operable in its connected mode to direct rotary power transmitted by the power switching mechanism to the secondary differential. The limited slip clutch assembly is operable under the control of the control system in one of an open mode and a locked mode. The limited slip clutch assembly is operable in its locked mode to inhibit relative rotation between the axleshafts. When the power switching mechanism and the torque transfer device are in their disconnected modes, rotary power is only transmitted to the primary vehicle wheels. The torque transfer device is operable in its disconnected mode to prevent the secondary vehicle wheels and the secondary differential from back-driving the input of the rear drive module, the propshaft, and the output of the power switching mechanism. The power switching mechanism is operable in its disconnected mode to prevent the transmission output from driving the output of the power switching mechanism and the propshaft.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and are not intended to limit the scope of the present disclosure in any way. Similar or identical elements are given consistent reference numerals throughout the various figures.

The present disclosure will become more fully understood from the detailed description and the accompanying drawings wherein:

FIG. 6 is an exploded perspective view of the power take-off unit constructed in accordance with the present teachings;

FIGS. 7 and 8 are sectional views of the power take-off unit constructed in accordance with the present teachings;

DETAILED DESCRIPTION

The following exemplary embodiments are provided so that the present disclosure will be thorough and fully convey the scope to those skilled in the art. Numerous specific details are set forth such as examples of specific components, devices and schematic configurations to provide a thorough understanding of exemplary embodiments of the present disclosure. However, it will be apparent to those skilled in the art that these specific details need not be employed, that the exemplary embodiments may be embodied in many different forms, and that neither should be construed to limit the scope of the present disclosure.

Figure 1:
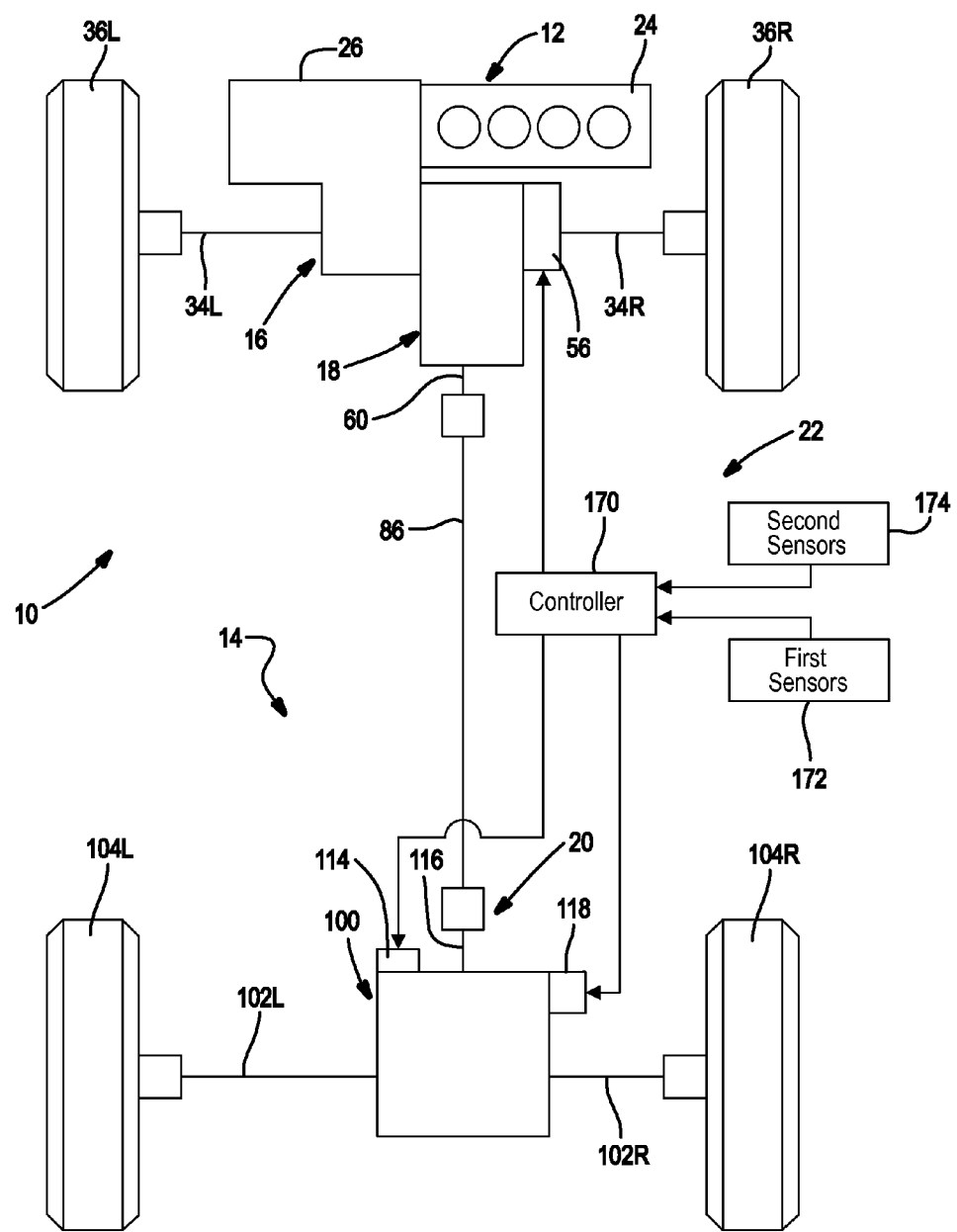
FIG. 1 is a schematic of a motor vehicle equipped with a disconnectable all-wheel drive system constructed in accordance with the present teachings.

With reference to FIG. 1 of the drawings, a motor vehicle constructed in accordance with the teachings of the present disclosure is schematically shown and generally indicated by reference numeral 10. The vehicle 10 can include a powertrain 12 and a drivetrain 14 that can include a primary driveline 16, a power switching mechanism 18, a secondary driveline 20, and a control system 22. In the various aspects of the present teachings, the primary driveline 16 can be a front driveline while the secondary driveline 20 can be a rear driveline.

The powertrain 12 can include a prime mover 24, such as an internal combustion engine or an electric motor, and a transmission 26 which can be any type of ratio-changing mechanism, such as a manual, automatic, or continuously variable transmission. The prime mover 24 is operable to provide rotary power to the primary driveline 16 and the power transfer mechanism 18.

Figure 2:
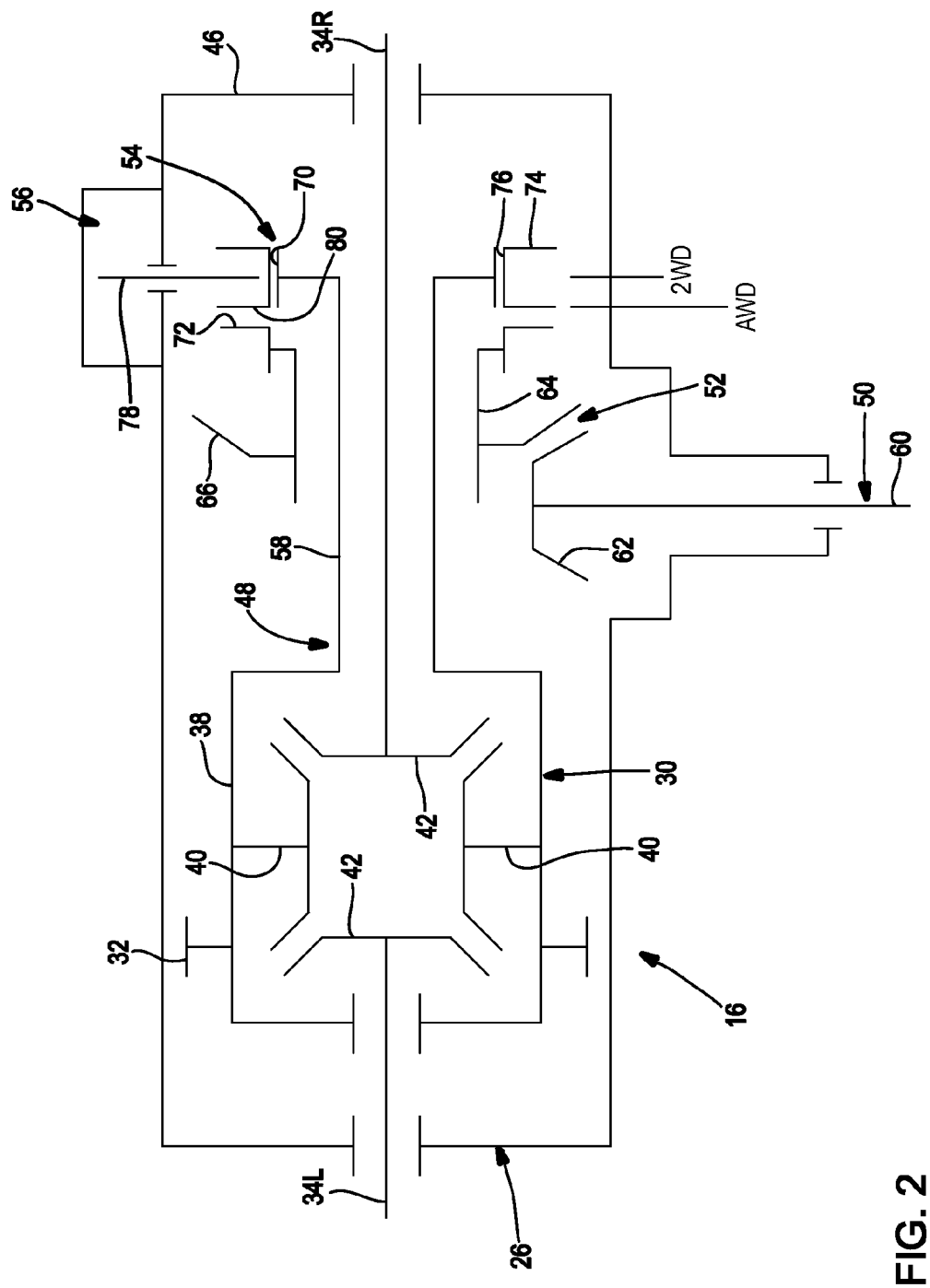
FIG. 2 is a schematic illustration of a power take-off unit associated with the disconnectable all-wheel drive system of FIG. 1.
Figure 3:
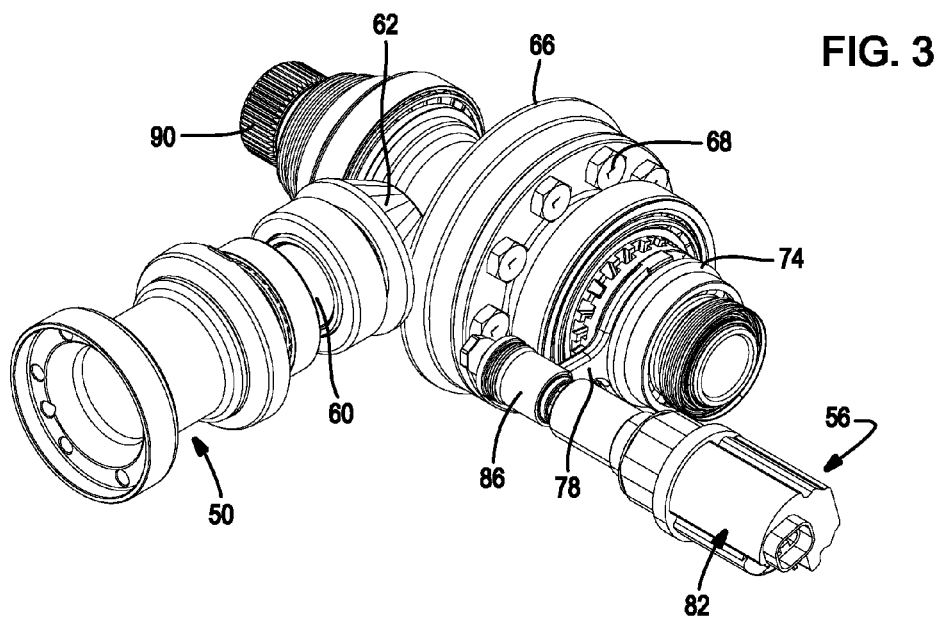
FIG. 3 through FIG. 5 are perspective views of a power take-off unit based on the schematic illustration shown in FIG. 2 with its housing structure removed for improved clarity and which is constructed in accordance with the present teachings.
Figure 4:
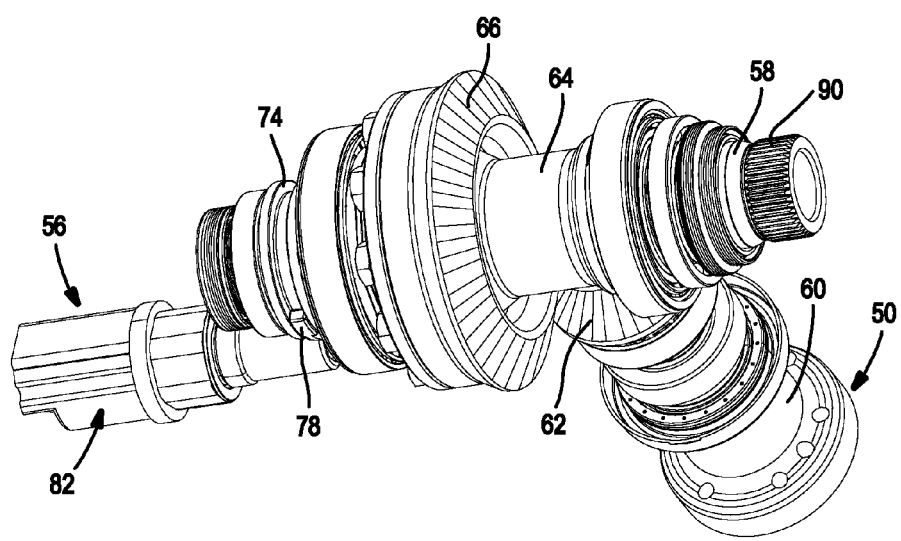
Figure 5:
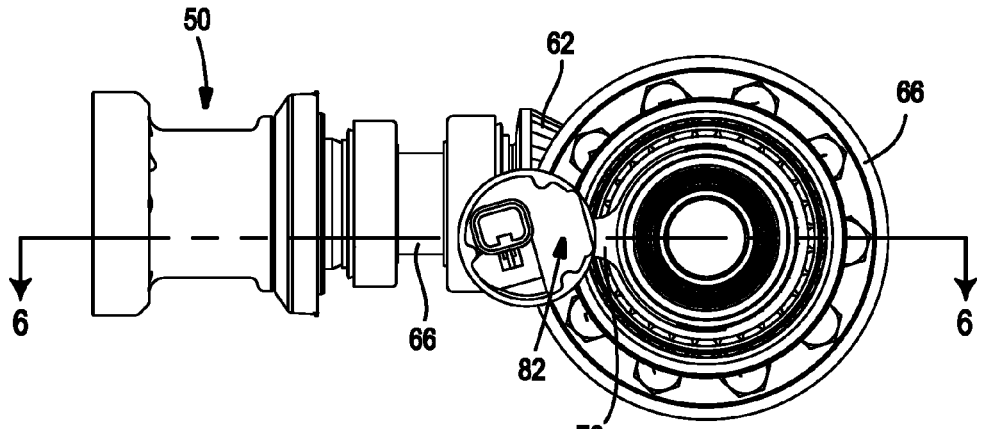
Figure 8:
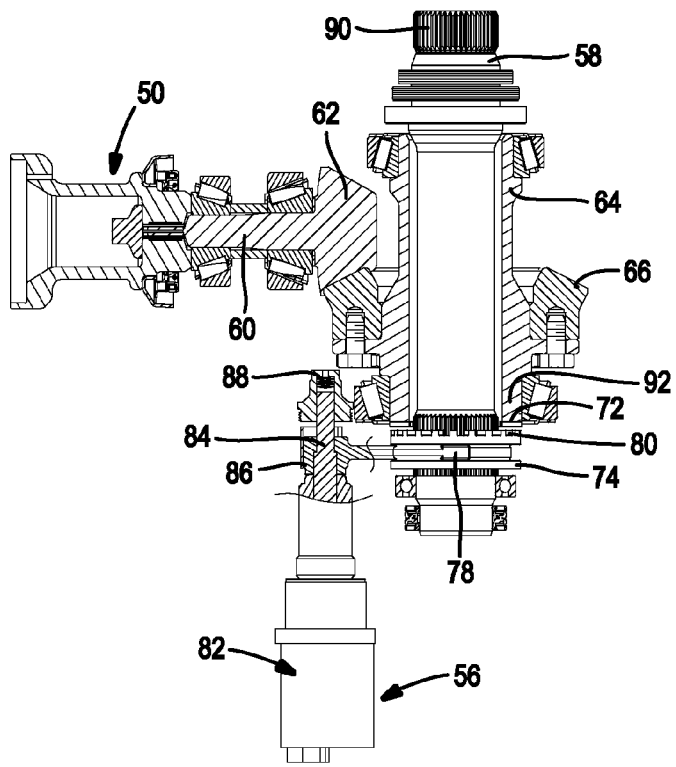

With additional reference to FIG. 2, the primary driveline 16 can include a first or primary differential 30 having an input member 32 driven by an output member (not shown) of the transmission 26. In the particular construction shown, the first differential 30 is configured as part of the transmission 26, a type commonly referred to as a transaxle and typically used in front-wheel drive vehicles. The primary driveline 16 can further include a pair of first axleshafts 34L, 34R that can couple output components of the first differential 30 to a first set of vehicle wheels 36L, 36R. The first differential 30 can include a first differential case 38 that is rotatably driven by the input member 32, at least one pair of first pinion gears 40 rotatably driven by the first differential case 38, and a pair of first output gears 42 meshed with the first pinion gears 40 and which are connected to drive the first axleshafts 34L, 34R.

With particular reference now to FIGS. 2 through 8, the power switching mechanism 18, hereinafter referred to as a power take-off unit (PTU), can include a housing 46, an input 48 coupled for common rotation with the first differential case 38 of the first differential 30, an output 50, a transfer gear assembly 52, a disconnect mechanism 54, and an actuator 56. The input 48 can include a tubular input shaft 58 rotatably supported by the housing 46 and which concentrically surrounds a portion of the first axleshaft 34R. A first end of the input shaft 58 can be coupled for rotation with the first differential case 38. The output 50 can include an output pinion shaft 60 rotatably supported by the housing 46 and having a pinion gear 62. The transfer gear assembly 52 can include a hollow gear shaft 64 and a hypoid gear 66 that is meshed with the pinion gear 62. The gear shaft 64 can concentrically surround a portion of the input shaft 58 and can be rotatably supported by the housing 46. The hypoid gear 66 can be integrally formed on, or fixed for common rotation with, the gear shaft 64 such as by bolts 68.

The disconnect mechanism 54 can comprise any type of clutch, disconnect or coupling device that can be employed to selectively transmit rotary power from the powertrain 14 to the secondary driveline 20. In the particular example provided, the disconnect mechanism 54 is generally configured as a dog clutch. The dog clutch can include a set of external spline teeth 70 formed on a second end of the input shaft 58, a set of face clutch teeth 72 formed on the gear shaft 64, a mode collar 74 having a set of internal spline teeth 76 constantly meshed with the external spline teeth 70 on the input shaft 58, and a shift fork 78 operable to axially translate the mode collar 74 between a first mode position and a second mode position. While schematically shown as a sliding dog clutch, and shown more specifically in FIGS. 3 through 8 as a face-type dog clutch, it will be understood that the disconnect mechanism 54 can include any suitable dog clutch or selectively engageable coupling device if such an alternative configuration is desired.

The mode collar 74 is shown in its first mode position, identified by a "2WD" leadline, wherein a set of face clutch teeth 80 formed on the mode collar 74 are disengaged from the face clutch teeth 72 on the gear shaft 64. As such, the input shaft 58 is disconnected from driven engagement with the gear shaft 64. Thus, no rotary power is transmitted from the powertrain 12 through the transfer gear assembly 52 to the output pinion shaft 60 of the power take-off unit 18. With the mode collar 74 in its second mode position, identified by an "AWD" leadline, its face clutch teeth 80 are engaged with the face clutch teeth 72 on the gear shaft 64. Accordingly, the mode collar 74 establishes a drive connection between the input shaft 58 and the gear shaft 64 such that rotary power from the powertrain 12 is transmitted through the power take-off unit 18 to the output pinion shaft 60. As will be detailed, the output pinion shaft 60 is coupled via a propshaft 86 to the secondary driveline 20.

The actuator 56 can be any type of actuator mechanism that is operable for axially moving the shift fork 78 which, in turn, causes concurrent axial translation of the mode collar 74 between its two distinct mode positions. The actuator 56 is shown mounted to the housing 46 of the power take-off unit 18. The actuator 56 can be a power-operated mechanism that can receive control signals from the control system 22 and can include, for example, hydraulically-actuated, pneumatically-actuated or electromechanically-actuated arrangements.

As noted, FIG. 2 schematically illustrates the components that can be associated with the power take-off unit 18. Reference now to FIGS. 3 through 8 will provide a more definitive structural configuration of such components that are associated with an exemplary embodiment of the power take-off unit 18. In particular, some of these figures illustrate the components in an assembled condition with portions of the housing 46 removed for improved clarity. Each of the input shaft 58, the gear shaft 64, and the output pinion shaft 60 are shown with suitable bearings assembled thereon for rotatably supporting each within or from the housing 46. The actuator 56 is shown as a self-contained power-operated unit 82 from which an axially moveable plunger 84 extends and to which a cylindrical hub portion 86 of the mode fork 74 is secured. The power-operated unit 82 can include an electromagnetic drive unit, such as a solenoid, configured to extend and retract the plunger 84 for causing concurrent translational movement of the shift fork 74. A return spring 88 is configured to assist in retracting the plunger 84 in a power-off (fail safe) condition of the power unit 82. External spline teeth 90 are formed on one end of the tubular input shaft 58 to facilitate a splined connection with a splined portion (not shown) of the first differential case 38. It can also be seen that the face clutch teeth 72 are formed on an enlarged annular boss portion 92 of the gear shaft 64 to provide for increased rigidity.

Figure 9:
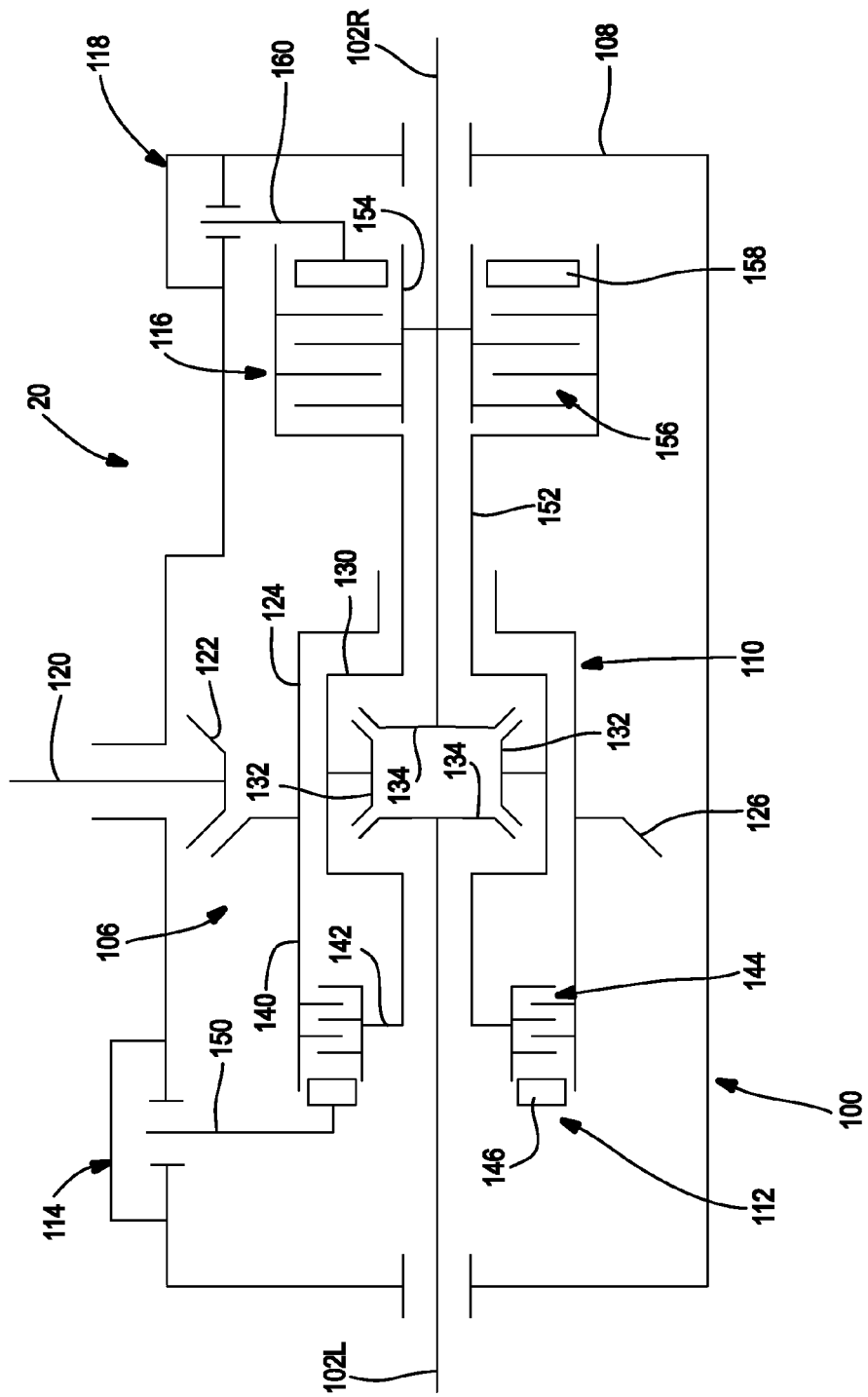
FIG. 9 is a schematic illustration of a rear drive module associated with the disconnectable all-wheel drive system of FIG. 1.
Figure 10:
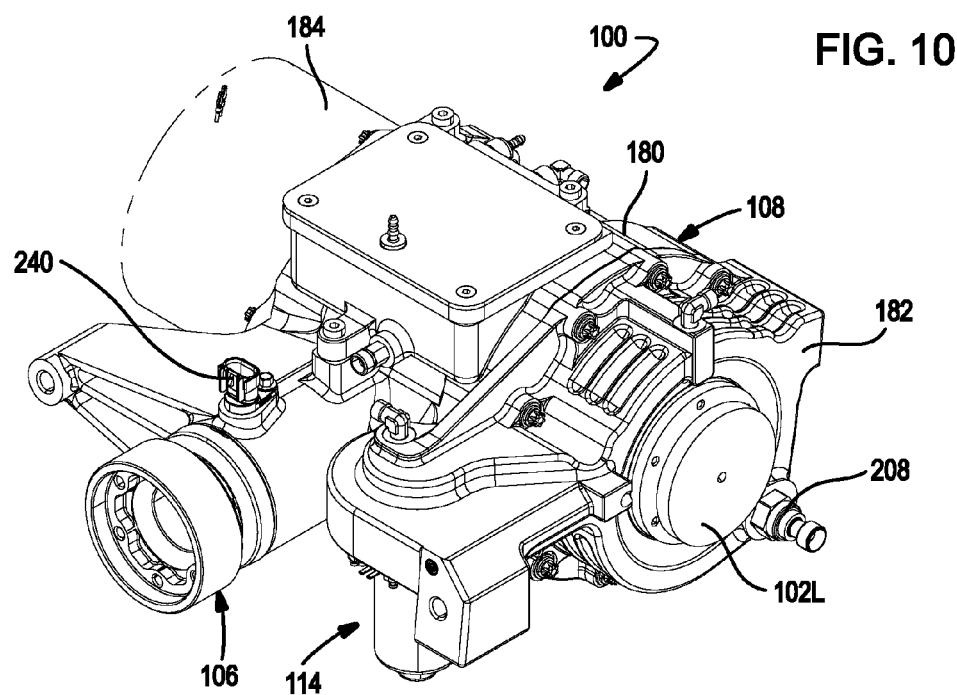
FIGS. 10 through 11 are perspective views of a rear drive module based on the schematic illustration shown in FIG. 9, with and without its housing structure, and which is constructed in accordance with the present teachings.
Figure 11:
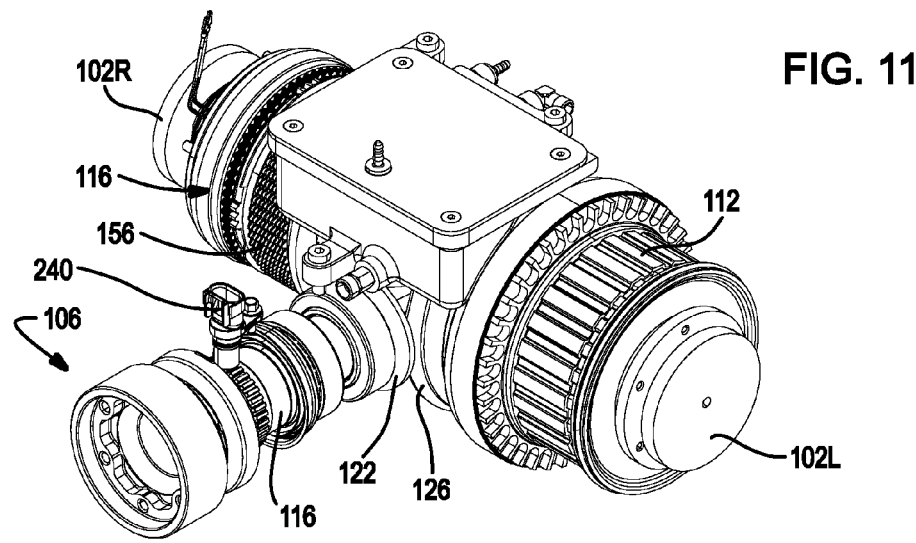

With particular reference now to FIGS. 1 and 9, the secondary driveline 20 can include the propshaft 86, a rear axle drive module (RDM) 100, a pair of second axleshafts 102L, 102R, and a set of secondary vehicle wheels 104L, 104R. A first end of the propshaft 86 can be coupled for rotation with the output pinion shaft 60 extending from the power take-off unit 18 while a second end of the propshaft 86 can be coupled for rotation with an input 106 of the rear drive module 100. The rear drive module 100 can generally include a housing 108, a second or secondary differential 110, a torque transfer device (TTD) 112, a TTD actuator 114, a limited slip clutch (LSC) assembly 116, and a LSC actuator 118.

The input 106 can include an input pinion shaft 120 having a pinion gear 122, a ring gear housing 124, and a ring gear 126 fixed for rotation with the ring gear housing 124 and which is meshed with the pinion gear 122. The second differential 110 can include a second differential case 130, at least one pair of second pinion gears 132 rotatably driven by the second differential case 30, and a pair of second output gears 134 that are meshed with the second pinion gears 132. The second output gears 134 are fixed for rotation with the inboard ends of the second axleshafts 102L, 102R.

The torque transfer device 112 can include any type of clutch or coupling device that can be employed to selectively transmit rotary power from the input 106 to the second differential case 130 of the second differential 110. In the example shown, the torque transfer device 112 is a multi-plate friction clutch that can include an input clutch member 140 driven by the ring gear housing 124, an output clutch member 142 coupled for rotation with the second differential case 130, a multi-plate clutch pack 144 having interleaved friction plates disposed between the input and output clutch members, and an engagement member 146 that is moveable for selectively applying a clutch engagement force to the clutch pack 144. The TTD actuator 114 is configured to generate translational movement of the engagement member 146 relative to the clutch pack 144 and can be controlled in response to control signals from the control system 22.

A first or "disconnected" mode can be established for the torque transfer device 112 when the engagement member 146 is positioned such that rotary power is not transmitted from the input clutch member 140 to the output clutch member 142. In this "disconnected" mode, the secondary vehicle wheels 104L, 104R, the second axleshafts 102L, 102R and the second differential 110 are disconnected from the input 106 of the rear drive module 100. As such, rotation of these components resulting from rolling motion of the secondary vehicle wheels 104L, 104R does not "back-drive" the input 106 of the rear drive module 100, the propshaft 86, and the output components of the power take-off unit 18.

A second or "connected" mode for the torque transfer device 112 can be established when the clutch engagement force exerted by the engagement member 146 on the clutch pack 144 causes rotary power to be transmitted from the input 106 to the second differential case 130 for delivery to the secondary vehicle wheels 104L, 104R through the second differential 110. In addition, a "torque biasing" function can also be provided in the connected mode since variable control over the magnitude of the clutch engagement force applied to the clutch pack 144 can vary the distribution ratio of the rotary power transmitted from the powertrain 12 to the primary driveline 16 and the secondary driveline 20. Thus, the torque transfer device 112 can be configured or controlled to slip or cyclically engage and disengage as appropriate for biasing the available drive torque while establishing the drive connection between the input 106 and the second differential 110.

The TTD actuator 114 can be any power-operated device capable of shifting the torque transfer device 112 between its first and second modes as well as adaptively regulating the magnitude of the clutch engagement force exerted by the engagement member 146 on the clutch pack 144. Thus, the TTD actuator 114 can, for example, include an electromagnetic or motor-driven ballscrew, ballramp or other cam actuation system having a mechanical connection, shown by lead line 150, with the engagement member 146. Alternatively, the TTD actuator 114 can include a hydraulic actuation system capable of regulating the position of the engagement member 146 relative to the clutch pack 144 by regulating fluid pressure, also indicated by the lead line 150, delivered to a pressure chamber.

The limited slip clutch assembly 116 can include any type of clutch or coupling device that can be employed to selectively limit speed differentiation between the second differential case 130 and the second axleshaft 102R. In the example shown, the limited slip clutch assembly 116 is a multi-plate friction clutch that can include an input clutch component 152 driven by the second differential case 130, an output clutch component 154 coupled for rotation with the second axleshaft 102R, a multi-plate clutch pack 156 having interleaved friction plates disposed between the input and output clutch components, and an actuation mechanism 158 that is moveable for selectively applying a clutch engagement force to the clutch pack 156. The LSC actuator 118 is provided to generate translational movement of a component of the actuation mechanism 158 relative to the clutch pack 156 and can be controlled by control signals from the control system 22.

A first or open differential mode can be established when the actuation mechanism 158 is positioned such that the second axleshaft 102R is permitted to rotate relative to the second differential case 130 without frictional resistance transmitted through the clutch pack 156. In this open differential mode, the rotary power transferred by the torque transfer device 112 to the secondary differential 110 is transmitted to the second vehicle wheels 104L, 104R based on the tractive road conditions.

A second or locked differential mode can also be established when the clutch engagement force exerted by the actuation mechanism 158 on the clutch pack 156 is of sufficient magnitude to prevent relative rotation between the second axleshaft 102R and the second differential case 130. With the second differential 110 locked, the axleshafts 102L and 102R are prevented from relative rotation and the rotary power transmitted through the torque transfer device 112 is divided equally to the secondary vehicle wheels 104L, 104R. In addition, a "side-to-side" torque biasing function can also be provided in the locked differential mode since variable control over the magnitude of the clutch engagement force applied to the clutch pack 156 can vary the distribution ratio of the rotary power transmitted through the second differential 110 to each of the secondary wheels 104L, 104R. Accordingly, the limited slip clutch assembly 116 can be configured or controlled to slip or cyclically engage and disengage as appropriate for biasing the side-to-side torque transfer between the secondary vehicle wheels 104.

The LSC actuator 118 can be any power-operated device capable of shifting the limited slip clutch assembly 116 between its first and second modes as well as adaptively regulating the clutch engagement force exerted on the clutch pack 156. The LSC actuator 118 can, for example, include an electromagnetically-actuated or motor-driven ballscrew, ballramp or other cam actuated system having a mechanical connection, shown by lead line 160. Alternatively, the LSC actuator 118 can include a hydraulic actuation system capable of regulating the hydraulic pressure exerted by the actuation mechanism 158 on the clutch pack 156. While shown as separate devices, it is also contemplated that a common actuator arrangement can be used to coordinate actuation of the torque transfer device 112 and the limited slip clutch assembly 116.

The control system 22 is schematically shown in FIG. 1 to include a controller 170, a group of first sensors 172, and a group of second sensors 174. The group of first sensor 172 can be arranged within the motor vehicle 10 to sense a vehicle parameter and responsively generate a first sensor signal. The vehicle parameter can be associated with any combination of the following: vehicle speed, yaw rate, steering angle, engine torque, wheel speeds, shaft speeds, lateral acceleration, longitudinal acceleration, throttle position and gear position without limitations thereto. The group of second sensors 174 can be configured to sense a driver-initiated input to one or more on-board devices and/or systems within the vehicle 10 and responsively generate a second sensor signal. For example, the motor vehicle 10 may be equipped with a mode sensor associated with a mode selection device, such as a push button or a lever, that senses when the vehicle operator has selected between vehicle operation in a two-wheel drive (FWD) mode, an all-wheel drive (AWD) mode, and an all-wheel drive-locked (AWD-LOCK) mode. Also, switched actuation of vehicular systems such as the windshield wipers, the defroster, and/or the heating system, for example, may be used by the controller 170 to assess whether the motor vehicle 10 should be shifted automatically between the FWD and AWD modes.

As noted, FIG. 9 schematically illustrates the components that can be associated with the rear drive module 100. Referring now to FIGS. 10 through 14, a more definitive structural configuration of such components associated with an exemplary embodiment of the rear drive module 100 is shown. The housing 108 can have at least three sections including a main housing section 180, a TTD housing section 182, and a LSC housing section 184 secured together via suitable bolts. The input 106 and the second differential 110 are installed and rotatably supported within an internal cavity formed in the main housing section 180. The ring gear housing 124 has the ring gear 126 bolted thereto and can include a set of internal splines 186 that are mated with a set of external splines 188 formed on a clutch drum 190 which defines the input clutch member 140 of the torque transfer device 112. The clutch drum 190 is a two-piece assembly including a radial drum plate 189 and a cylindrical drum 191 to which the outer friction clutch plates are coupled.

The second differential case 130 of the second differential 110 is rotatably supported by a pair of laterally-spaced bearing 192 within the outer differential housing 124 and can include a first tubular boss 194 that extends into the torque transfer device 112 and a second tubular boss 196 that extends into the limited slip clutch assembly 116. A clutch hub 198 can be coupled (i.e., splined) for rotation with the first boss 194 and defines the output clutch member 142 of the torque transfer device 112. The engagement member 146 can be a hydraulic piston assembly 200 that is slidably disposed with a pressure chamber 202 formed in the TTD housing section 182 for movement relative to the clutch pack 144. The TTD actuator 114 can include a pump assembly 204 operated via the control system 22 to generate and regulate the hydraulic fluid pressure delivered from an accumulator 206 to the pressure chamber 202. A pressure transducer 208, associated with the first sensors 172, can be provided to detect the fluid pressure in the pressure chamber 202 and to transmit a sensor signal to the controller 170.

Figure 12:
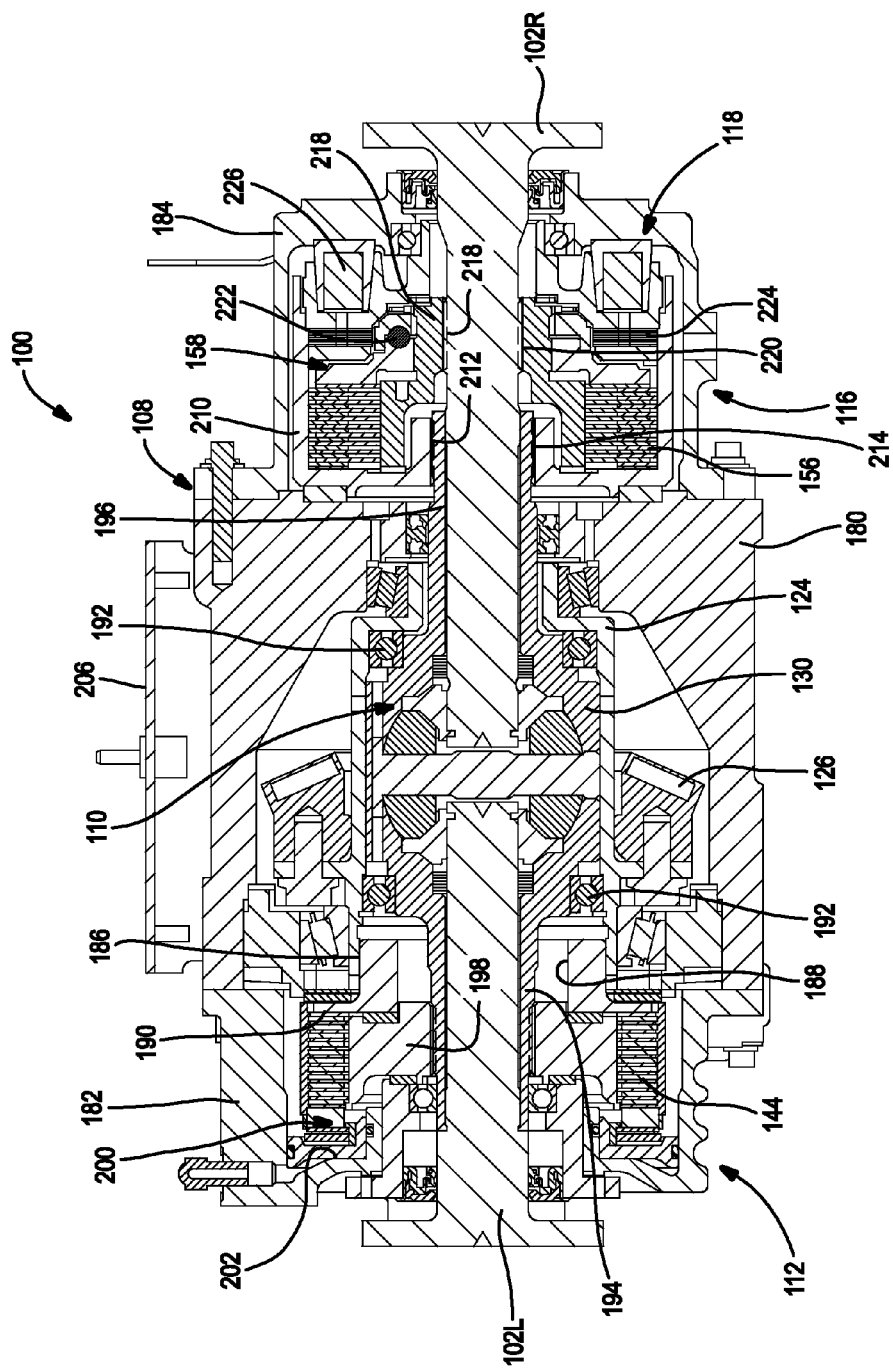
FIG. 12 is a sectional view of the rear drive module constructed in accordance with the present teachings.
Figure 13:
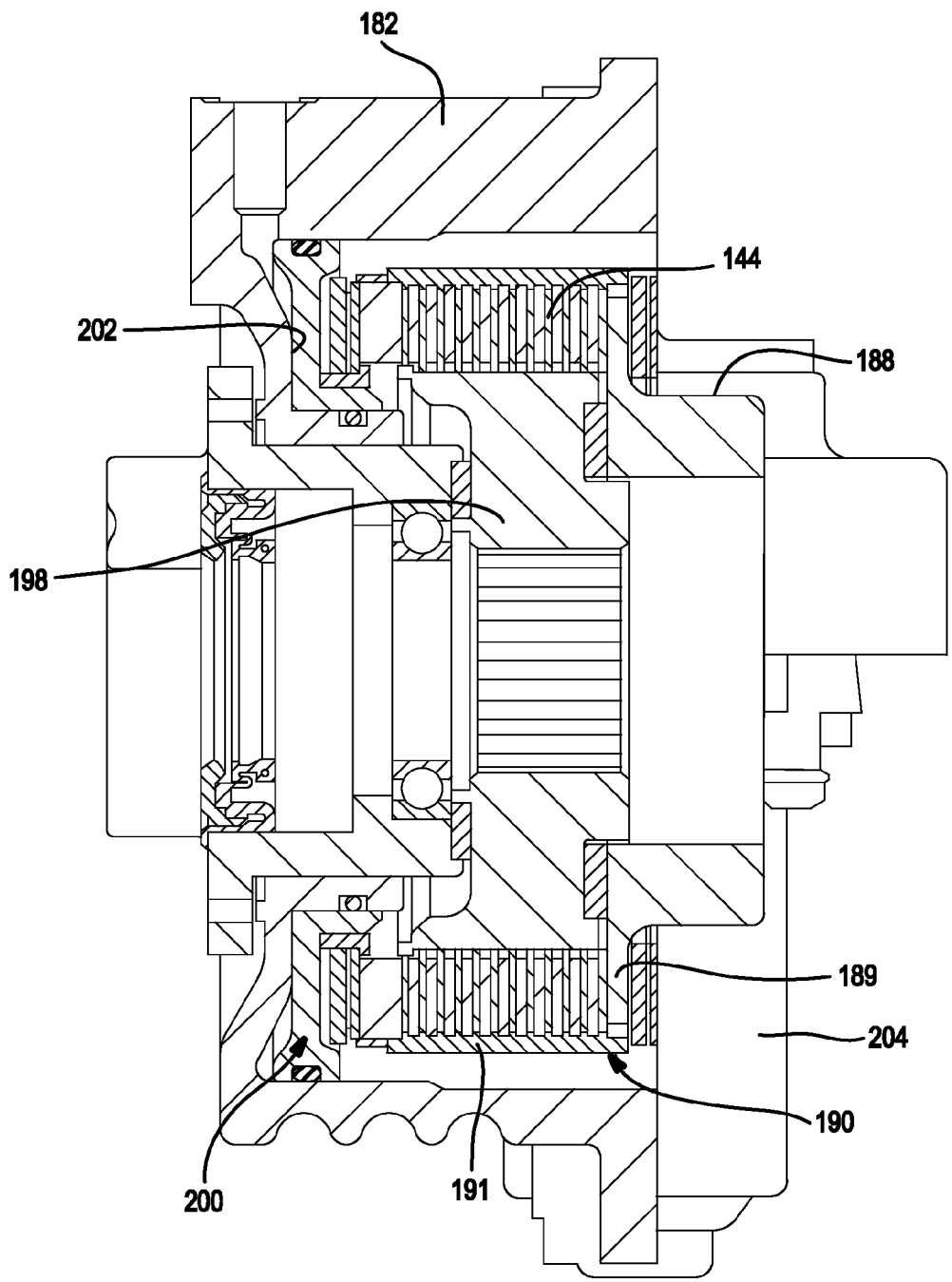
FIG. 13 is an enlarged partial view of the rear drive module of FIG. 12 showing the components associated with the torque transfer device in greater detail.
Figure 14:
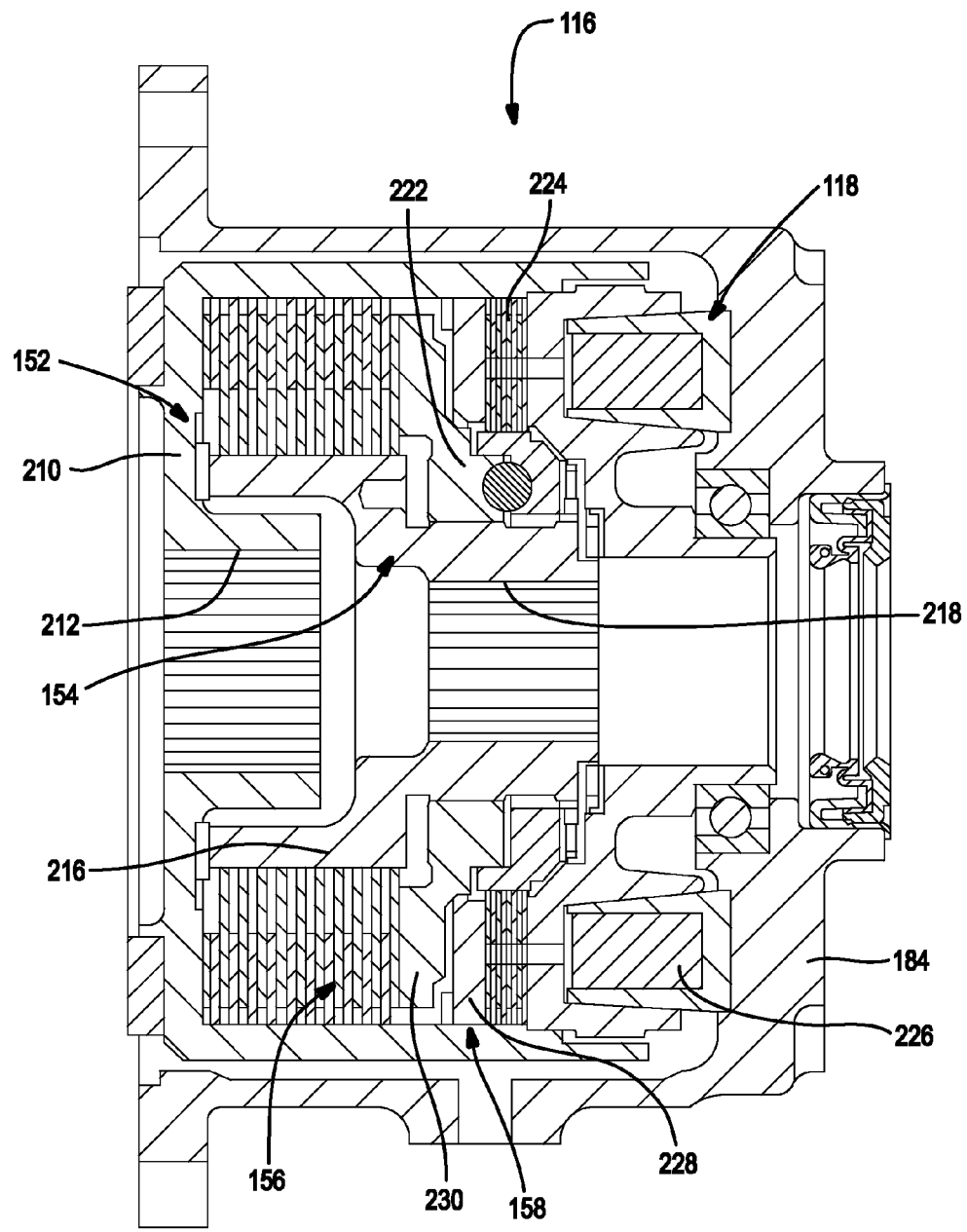
FIG. 14 is an enlarged partial view of the rear drive module of FIG. 12 showing the components associated with the limited slip clutch assembly in greater detail.

The limited slip clutch assembly 116 is best shown in FIGS. 12 and 14 and can be configured as an electromagnetically-actuated ballramp clutch. The input clutch component 152 can include a clutch drum 210 having a set of internal splines 212 that are mated with a set of external splines 214 formed on the second boss 196 of the second differential case 130. The output clutch component 154 can include a clutch hub 216 having a set of internal splines 218 that are mated with a set of external splines 220 formed on the second axleshaft 102R. The actuation mechanism 158 can include a ballramp unit 222 and a pilot clutch 224 that is disposed between the ballramp unit 222 and the clutch drum 210. The LSC actuator 118 can include an electromagnetic coil 226 and an armature plate 228 between which the pilot clutch 224 is located. Control signals sent from the controller 170 to the electromagnetic coil 226 can function to cause the armature plate 228 to translate and engage the pilot clutch 224 which, in turn, activates the ballramp unit 222 for causing axial movement of an apply plate 230 relative to the clutch pack 156. As such, control over the axial position of the apply plate 230 controls the magnitude of the clutch engagement force exerted on the clutch pack 156 for establishing the first and second modes of the limited slip clutch assembly 116. When operating in its second mode, the clutch engagement force applied by the apply plate 230 on the clutch pack 156 functions to limit relative rotation between the second differential case 130 (via the clutch drum 210) and the second axleshaft 102R (via the clutch hub 216).

With reference to FIGS. 1, 2 and 9, the vehicle 10 can normally be operated in the two-wheel drive (FWD) mode in which the power take-off unit 18 and the rear drive module 100 are both disengaged. Specifically, the mode collar 74 of the disconnect mechanism 54 is positioned by the actuator 56 in its first mode position such that the input shaft 58 is uncoupled from the gear shaft 64. As such, substantially all power provided by the powertrain 12 is transmitted to the primary driveline 16. Likewise, the torque transfer device 112 can be shifted into and maintained in its first (disconnected) mode such that the input 106, the propshaft 86, the output pinion shaft 60 and the transfer gear assembly 52 within the power take-off unit 18 are not back-driven due to rolling movement of the secondary wheels 104. The limited slip clutch assembly 116 can also be maintained in its first (open differential) mode when the vehicle is operating in tis two-wheel drive mode. There may be situations during operation of the vehicle 10 in the two-wheel drive mode when it would be beneficial, for vehicle dynamics purposes (e.g. yaw dampening), to actuate the limited slip clutch assembly 116 even when no drive torque is transmitted to the secondary driveline 20. Thus, the controller 170 can control actuation of the LSC actuator 118 to shift the limited slip clutch assembly 116 into its second mode and adaptively regulate speed differentiation between the second vehicle wheels 104L, 104R.

When it is desired or necessary to operate the motor vehicle 10 in the all-wheel drive (AWD) mode, the control system 22 can be activated via a suitable input which, as noted, can include a drive requested input (via the mode select device) and/or an input generated by the controller 170 in response to signals from the first sensors 172 and/or the second sensors 174. The controller 170 initially signals the TTD actuator 114 to shift the torque transfer device 112 into its second (connected) mode. Specifically, the controller 170 controls operation of the TTD actuator 114 such that the actuation member 146 is moved and a clutch engagement force is exerted on the clutch pack 144 that is sufficient to synchronize the speed of the secondary driveline 20 with the speed of the primary driveline 16. A speed sensor 240 (FIGS. 10 and 11) can detect the rotary speed of the input pinion shaft 116 and send the indicated speed signal to the controller 170 for use in determining speed synchronization. Upon speed synchronization, the controller 170 signals the actuator 56 to cause the mode collar 74 in the power take-off unit 18 to move from its first mode position into its second mode position. With the mode collar 74 in its second mode position, rotary power is transmitted from the powertrain 12 to the primary driveline 16 and the secondary driveline 20. It will be appreciated that subsequent control of the magnitude of the clutch engagement force generated by the torque transfer device 112 permits torque biasing across the clutch pack 144 for controlling the torque distribution ratio transmitted from the powertrain 12 to the primary driveline 16 and the secondary driveline 20.

When it is desired or necessary to operate the vehicle 10 in its all-wheel drive-locked (AWD-LOCK) mode, the control system 22 can signal the LSC actuator 118 to shift the limited slip clutch assembly 116 from normal operation in its first mode into its second mode. As noted, such action causes the actuation mechanism 158 to engage the clutch pack 156 and, depending on the magnitude of the clutch engagement force, limit or totally inhibit speed differentiation between the second axleshafts 102L, 102R. It is contemplated that the mode selector could permit the vehicle operator to select the AWD-LOCK mode when the vehicle 10 is operating off-road or is struck in mud or snow. As an alternative, actuation of the limited slip clutch assembly 116 can be totally automatic without input from the vehicle operator. In either scenario, the limited slip clutch assembly 116 provides enhanced off-road traction performance and driving dynamic capability in addition to a yaw damping feature.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration, or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:

1. A drivetrain for an all-wheel drive motor vehicle, the drivetrain comprising:
   a primary driveline being adapted to drive a pair of primary vehicle wheels, said primary driveline including a first differential having a first differential case driving a pair of first output gears, and a pair of first axleshafts interconnecting said first output gears to said primary vehicle wheels;
   a power switching mechanism having an input shaft adapted to receive rotary power from said first differential case, an output pinion shaft, and a disconnect mechanism, said disconnect mechanism being operable in a disconnected mode to inhibit transmission of rotary power between said input shaft and said output pinion shaft and in a connected mode to permit transmission of rotary power between said input shaft and said output pinion shaft; and
   a secondary driveline being adapted to drive a pair of secondary vehicle wheels, said secondary driveline including a propshaft and a rear drive module, said rear drive module including an input pinion shaft, a second differential, a pair of second axleshafts drivingly connected to said pair of secondary vehicle wheels, a torque transfer device, and a limited slip clutch assembly, said second differential having a second differential case driving a pair of second output gears that are drivingly connected to said second axleshafts, said input pinion shaft being coupled by said propshaft to said output pinion shaft of said power switching mechanism, said torque transfer device being operable in a first mode to inhibit transmission of rotary power between said input pinion shaft and said second differential case and in a second mode to permit transmission of rotary power between said input pinion shaft and said second differential case, and said limited slip clutch assembly being operable in a first mode to permit speed differentiation between said second differential case and one of said second axleshafts and in a second mode to inhibit speed differentiation between said second differential case and said one of said second axleshafts.

2. The drivetrain of claim 1 wherein said power switching mechanism is a power take-off unit including a transfer gear assembly driving said output pinion shaft, wherein said disconnect mechanism includes a mode collar coupled for common rotation with said input shaft and sliding movement between a first mode position and a second mode position, wherein said mode collar is disengaged from said transfer gear assembly when said mode collar is positioned in its first mode position, and wherein said mode collar connects said transfer gear assembly to said input shaft when said mode collar is positioned in its second mode position.

3. The drivetrain of claim 2 wherein said transfer gear assembly includes a gear shaft rotatably surrounding said input shaft and a hypoid gear fixed to said gear shaft that is meshed with a pinion gear fixed to said output pinion shaft, wherein a set of first face clutch teeth are formed on said gear shaft and a set of second face clutch teeth are formed on said mode collar, and wherein said second face clutch teeth are in meshed engagement with said first face clutch teeth when said mode collar is positioned in its second mode position.

4. The drivetrain of claim 2 wherein said rear drive module further includes a ring gear fixed for rotation with a ring gear housing and which is driven by a pinion gear fixed to said input pinion shaft, wherein said torque transfer device is a first friction clutch disposed between said ring gear housing and said second differential case, and wherein said limited slip clutch assembly is a second friction clutch disposed between said second differential case and said one of said second axleshafts.

5. The drivetrain of claim 4 wherein a two-wheel drive mode is established for the motor vehicle when said mode collar is located in its first mode position, said torque transfer device is operating in its first mode and said limited slip clutch assembly is operating in its first mode such that substantially all rotary power is transmitted by said primary driveline to said primary vehicle wheels, and wherein said input pinion shaft of said rear drive module and said propshaft are not back-driven by said second differential.

6. The drivetrain of claim 4 wherein an all-wheel drive mode is established for the motor vehicle when said mode collar is located in its second mode position, said torque transfer device is operating in its second mode and said limited slip clutch assembly is operating in its first mode.

7. The drivetrain of claim 4 wherein an all-wheel locked drive mode is established for the motor vehicle when said mode collar is located in its second mode position, said torque transfer device is operating in its second mode and said limited slip clutch assembly is operating in its second mode.

8. The drivetrain of claim 1 wherein a two-wheel drive mode for the motor vehicle is established when said disconnect mechanism is operating in its disconnected mode, said torque transfer device is operating in its first mode, and said limited slip clutch assembly is operating in its first mode.

9. The drivetrain of claim 1 wherein an all-wheel drive mode for the motor vehicle is established when said disconnect mechanism is operating in its connected mode, said torque transfer device is operating in its second mode, and said limited slip clutch assembly is operating in its first mode.

10. The drivetrain of claim 1 wherein an all-wheel locked drive mode for the motor vehicle is established when said disconnect mechanism is operating in its connected mode, said torque transfer device is operating in its second mode, and said limited slip clutch assembly is operating in its second mode.

11. The drivetrain of claim 1 wherein said rear drive module includes a multi-piece housing having a central housing section from which said input pinion shaft and said second differential are rotatably supported, a first end housing section within which said torque transfer device is disposed, and a second end housing section within which said limited slip clutch assembly is disposed, wherein said second differential case includes a first boss portion extending from said central housing section into said first end housing section and a second boss portion extending from said central housing section into said second end housing section, wherein said torque transfer device includes a first friction clutch operably disposed between a housing driven by said input pinion shaft and said first boss portion of said second differential case, and wherein said limited slip clutch assembly includes a second friction clutch operably disposed between said second boss portion of said second differential case and said one of said second axleshafts.

12. The drivetrain of claim 11 wherein said first friction clutch is hydraulically-actuated to shift said torque transfer device between its first and second modes, and wherein said second friction clutch is electro-magnetically actuated to shift said limited slip clutch assembly between its first and second modes.

13. The drivetrain of claim 12 wherein said second friction clutch includes an electromagnetically-actuated ballramp actuator.

14. A drivetrain for an all-wheel drive motor vehicle, the drivetrain comprising:
a primary driveline being adapted for driving a pair of primary vehicle wheels, said primary driveline including a first differential having a first differential case;
a power take-off unit having an input shaft adapted to receive rotary power from said first differential case, an output pinion shaft, a transfer gear assembly drivingly connected to said output pinion shaft, and a disconnect mechanism, said disconnect mechanism having a mode collar coupled for common rotation with said input shaft and sliding movement between a first mode position and a second mode position, said mode collar is disengaged from said transfer gear assembly when positioned in its first mode position and said mode collar connects said transfer gear assembly to said input shaft when positioned in its second mode position; and
a secondary driveline being adapted to drive a pair of secondary vehicle wheels, said secondary driveline including a propshaft and a rear drive module, said rear drive module including an input pinion shaft, a ring gear driven by said input pinion shaft, a ring gear housing fixed for rotation with said ring gear, a second differential having a second differential case driving a pair of output gears, a pair of axleshafts interconnecting said pair of output gears to said pair of secondary vehicle wheels, a torque transfer device operably disposed between said ring gear housing and said second differential case, and a limited slip clutch assembly operably disposed between said second differential case and one of said axleshafts, wherein said propshaft interconnects said output pinion shaft of said power take-off unit to said input pinion shaft of said rear drive module, wherein said torque transfer device is operable in a first mode to inhibit transmission of rotary power between said ring gear housing and said second differential case and in a second mode to permit transmission of rotary power between said ring gear housing and said second differential case, and wherein said limited slip clutch assembly is operable in a first mode to permit relative rotation between said second differential case and said one of said axleshafts and in a second mode to inhibit relative rotation between said second differential case and said one of said axleshafts.

15. The drivetrain of claim 14 wherein said transfer gear assembly includes a gear shaft rotatably surrounding said input shaft and a hypoid gear fixed for rotation with said gear shaft and which is meshed with a pinion gear fixed to said output pinion shaft, wherein a set of first face clutch teeth are formed on said gear shaft and a set of second face clutch teeth are formed on said mode collar, and wherein said second face clutch teeth are in meshed engagement with said first face clutch teeth when said mode collar is positioned in its second mode position.

16. The drivetrain of claim 14 wherein a two-wheel drive mode is established for the motor vehicle when said mode collar is located in its first mode position, said torque transfer device is operating in its first mode and said limited slip clutch assembly is operating in its first mode such that substantially all rotary power is transmitted by said primary driveline to said primary vehicle wheels, and wherein said input pinion shaft of said rear drive module and said propshaft are not back-driven by said second differential.

17. The drivetrain of claim 14 wherein an all-wheel drive mode is established for the motor vehicle when said mode collar is located in its second mode position, said torque transfer device is operating in its second mode and said limited slip clutch assembly is operating in its first mode.

18. The drivetrain of claim 14 wherein an all-wheel locked drive mode is established for the motor vehicle when said mode collar is located in its second mode position, said torque transfer device is operating in its second mode and said limited slip clutch assembly is operating in its second mode.

19. The drivetrain of claim 14 wherein said rear drive module includes a multi-piece housing having a central housing section from which said input pinion shaft, said ring gear housing and said second differential are rotatably supported, a first end housing section within which said torque transfer device is disposed, and a second end housing section within which said limited slip clutch assembly is disposed, wherein said second differential case includes a first boss portion extending from said central housing section into said first end housing section and a second boss portion extending from said central housing section into said second end housing section, wherein said torque transfer device includes a first friction clutch operably disposed between said ring gear housing and said first boss portion of said second differential case, and wherein said limited slip clutch assembly includes a second friction clutch operably disposed between said second boss portion of said second differential case and said one of said axleshafts.

20. The drivetrain of claim 19 wherein said first friction clutch is hydraulically-actuated to shift said torque transfer device between its first and second modes, and wherein said second friction clutch is electro-magnetically actuated to shift said limited slip clutch assembly between its first and second modes.

* * * * *